US005774292A

United States Patent [19]
Georgiou et al.

[11] Patent Number: 5,774,292
[45] Date of Patent: Jun. 30, 1998

[54] DISK DRIVE POWER MANAGEMENT SYSTEM AND METHOD

[75] Inventors: Christos John Georgiou, White Plains; Edward Scott Kirkpatrick, Croton-on-Hudson, both of N.Y.

[73] Assignee: International Business Machines Corporation, Armonk, N.Y.

[21] Appl. No.: 421,271

[22] Filed: Apr. 13, 1995

[51] Int. Cl.⁶ .................................................. G11B 15/46
[52] U.S. Cl. ......................... 360/73.03; 360/69; 369/50; 395/750.06
[58] Field of Search ........................... 360/69, 71, 73.01, 360/73.03, 74.1, 75, 78.01, 78.04, 105; 369/47, 53, 54, 50; 395/750.05, 750.06, 750.07

[56] References Cited

U.S. PATENT DOCUMENTS

| | | | |
|---|---|---|---|
| 5,345,342 | 9/1994 | Abbott et al. | 360/77.08 X |
| 5,345,347 | 9/1994 | Hopkins et al. | 360/71 X |
| 5,355,366 | 10/1994 | Li | 370/94.2 |
| 5,402,200 | 3/1995 | Shrinkle et al. | 360/69 |
| 5,412,519 | 5/1995 | Buettner et al. | 360/75 X |
| 5,452,277 | 9/1995 | Bajorek et al. | 360/69 X |
| 5,481,733 | 1/1996 | Douglis et al. | 395/750 |
| 5,493,670 | 2/1996 | Douglis et al. | 360/75 X |
| 5,521,896 | 5/1996 | Bajorek et al. | 360/69 X |

FOREIGN PATENT DOCUMENTS

| | | | |
|---|---|---|---|
| 0533664 A2 | 8/1993 | European Pat. Off. | G11B 25/04 |
| WO 95/34070 | 12/1995 | WIPO | G11B 19/00 |

OTHER PUBLICATIONS

F. Douglis et al, "Thwarting the Power–Hungry Disk" 1994 Winter USENIX—Jan., 17–21, 1994 San Francisco, CA. pp. 293–306.

Patent Abstract of Japan, vol. 15 No. 220 May 6, 1991, Harayuki Hard Disk Controller.

*Primary Examiner*—Andrew L. Sniezek

[57] ABSTRACT

A system and method for optimizing power consumption by a disk drive unit. The system and method monitor and analyze historical use data and calculate a predicted inactivity duration. The predicted inactivity duration is used to power-down the rotational speed of the drive to the first of one or more intermediate rotational speeds. Continued inactivity will result in further speed reduction until the drive is ultimately powered off. The drive increases rotational speed on demand.

17 Claims, 3 Drawing Sheets

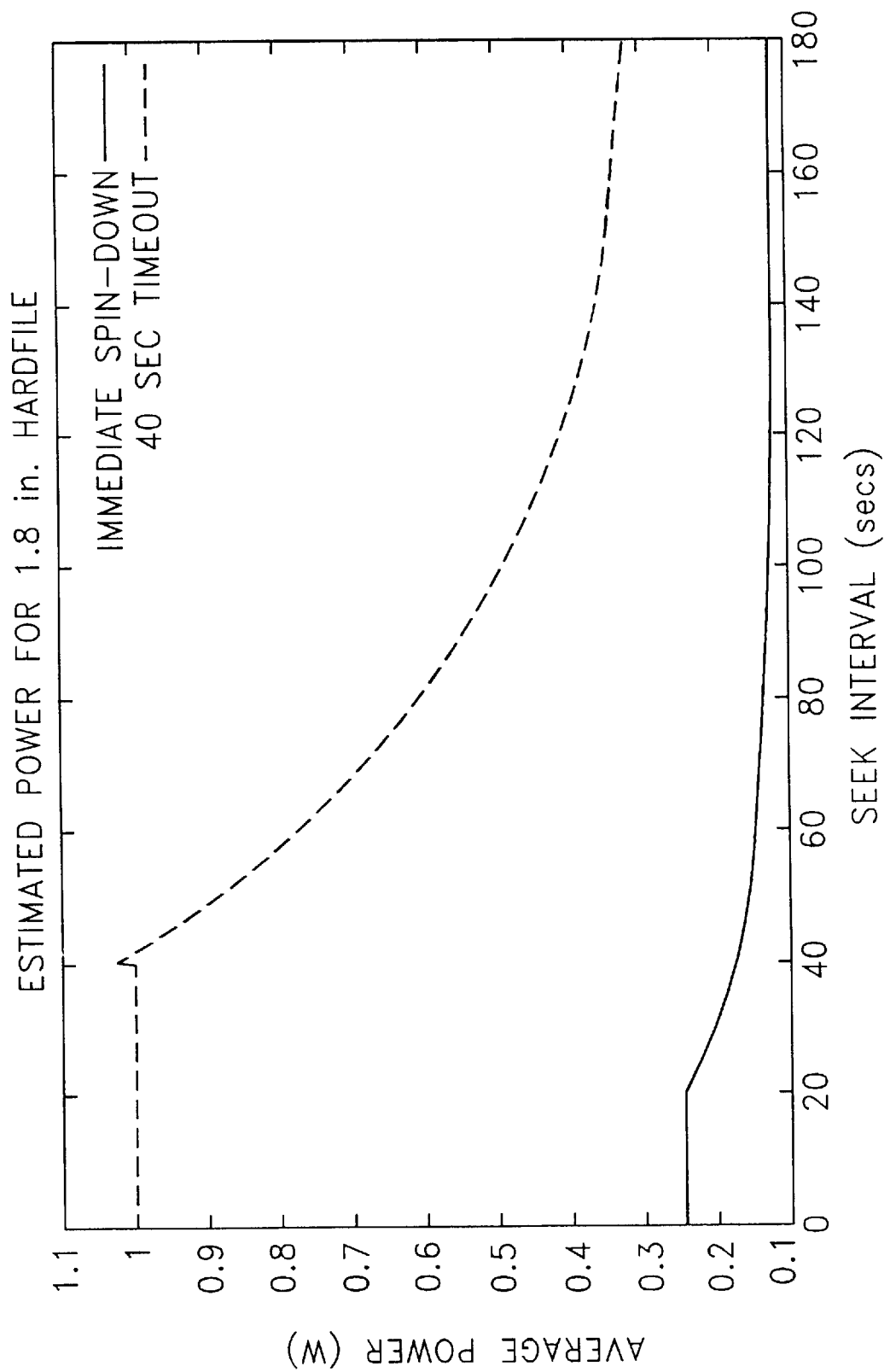

DISK DRIVE POWER MANAGEMENT SYSTEM AND METHOD

FIELD OF THE INVENTION

The present invention relates generally to managing power in computing systems, and more particularly to the power consumption of disk drives in personal computers.

BACKGROUND OF THE INVENTION

Disk drives in laptop computer systems consume a significant amount of power when in operation. For example, a 2.5" disk drive may consume up to 30% of total system power while a 1.8" drive may consume up to 20%. Prior-art approaches to reduce the disk drive power consumption involve depowering the drive after some timeout period (typically minutes), and repowering it when system activity resumes. However, this approach (typically performed in software external to the disk controller) suffers from a number of disadvantages, such as: a) there is a considerable time delay for a disk drive in the off state to come up to speed (typically on the order of a few seconds—a delay that may in some circumstances be unacceptable to many users); b) there is considerable power required to bring a disk drive from an off state up to speed (which may offset the benefits of depowering it); c) frequent depowering/repowering of a drive increases its likelihood of failure; d) prior-art methods of detecting system activity require running the drive at a high rate of power consumption until some fixed predetermined "timeout" period has expired without activity, offsetting the benefits of subsequently powering the drive down. Thus, it is apparent in light of these drawbacks that there is a need for better ways of managing disk drive power consumption.

SUMMARY OF THE INVENTION

The invention is a method for conserving electrical power in the inactivity periods between computer disk drive accesses comprising the following steps: a) monitoring each occurrence of disk drive access; b) measuring the lengths of inactivity periods between each disk drive access; c) predicting the length of a next inactivity period following the measured inactivity periods based on the lengths of the measured inactivity periods; d) reducing the rotational speed of the disk value when the predicted length of the next inactivity period is greater than a predetermined value.

In one embodiment of the invention, the reduction in rotational speed can be gradual, i.e., a "spin-down" mode, without necessarily reducing the speed to a complete stop.

FIGURES

FIG. 3 is plot of power use vs. seek interval comparing the power consumption of one embodiment of the system and method of the present invention with prior consumption of prior techniques for power management.

DETAILED DESCRIPTION OF THE INVENTION

This invention is a novel system and method for conserving power in the disk drive subsystem of a computer. The method involves varying the disk drive's rotational speeds as a function of system activity. It is well known that the amount of power consumed by a disk drive is related to the speed at which the drive is rotated. But instead of the on/off approach of the prior art, the present approach employs multiple power level states. For example, a low speed (which could be ⅓ of the maximum speed) could be used as one intermediate state between full speed and off. The disk drive is operated at the low speed, i.e., in the intermediate state, until a flurry of activity is detected, which would indicate a need for operation at the full speed. When the disk is known to be inactive, the drive is placed in the off state. More granularity in the rotational speed can be achieved by including additional states.

An important feature of the present invention is that data can be reliably written to and read from the disk at multiple rotational speeds. This has been made possible through the use of magnetoresistive heads, which produce reliable bit pulses at any speed. The disk drive controller includes a programmable phase locked loop (PLL) for synchronizing to the multiple bit rates. (Programmable PLLs are well known by those skilled in the art. PLL's are described in detail in W. C. Lindsey and C. M. Chie, "A Survey of Digital Phase-Locked Loops," IEEE Proc. Vol. 69, pp. 410–431, April 1981; R. M. Hickling, "A Single Chip 2 Gbit/s Clock Recovery Subsystem for Digital Communications," Proc. of RF Technology Expo, 88, published by Cardiff Publishing, Anaheim, Calif., pp. 493–497, Feb. 10–12, 1988; S. Hao and Y. Puqiang, "A High Lock-In Speed Digital Phase-Locked Loop," IEEE Trans. of Comm., Vol 39, No. 3, pp. 365–368, March 1991, each incorporated herein by reference.) Changing the frequency of a PLL and resynchronizing it requires a few microseconds, a very short time compared to the mechanical time constants of rotating media, and therefore the PLL will not introduce any appreciable delay in the speed changing operation.

Another key element of this approach is a means for detecting or predicting disk drive activity, and a policy for changing the disk drive's rotational speed. The activity can easily be monitored by providing a timer at the disk drive controller that is reset every time the disk is accessed. The value of the timer can be used as input to an algorithm that determines when the change to the rotational speed is to be made. Prediction of activity can be performed by incorporating an activity prediction algorithm (described later) into the file system or disk cache software that transfers large blocks of data to and from the disk.

Figure 1:
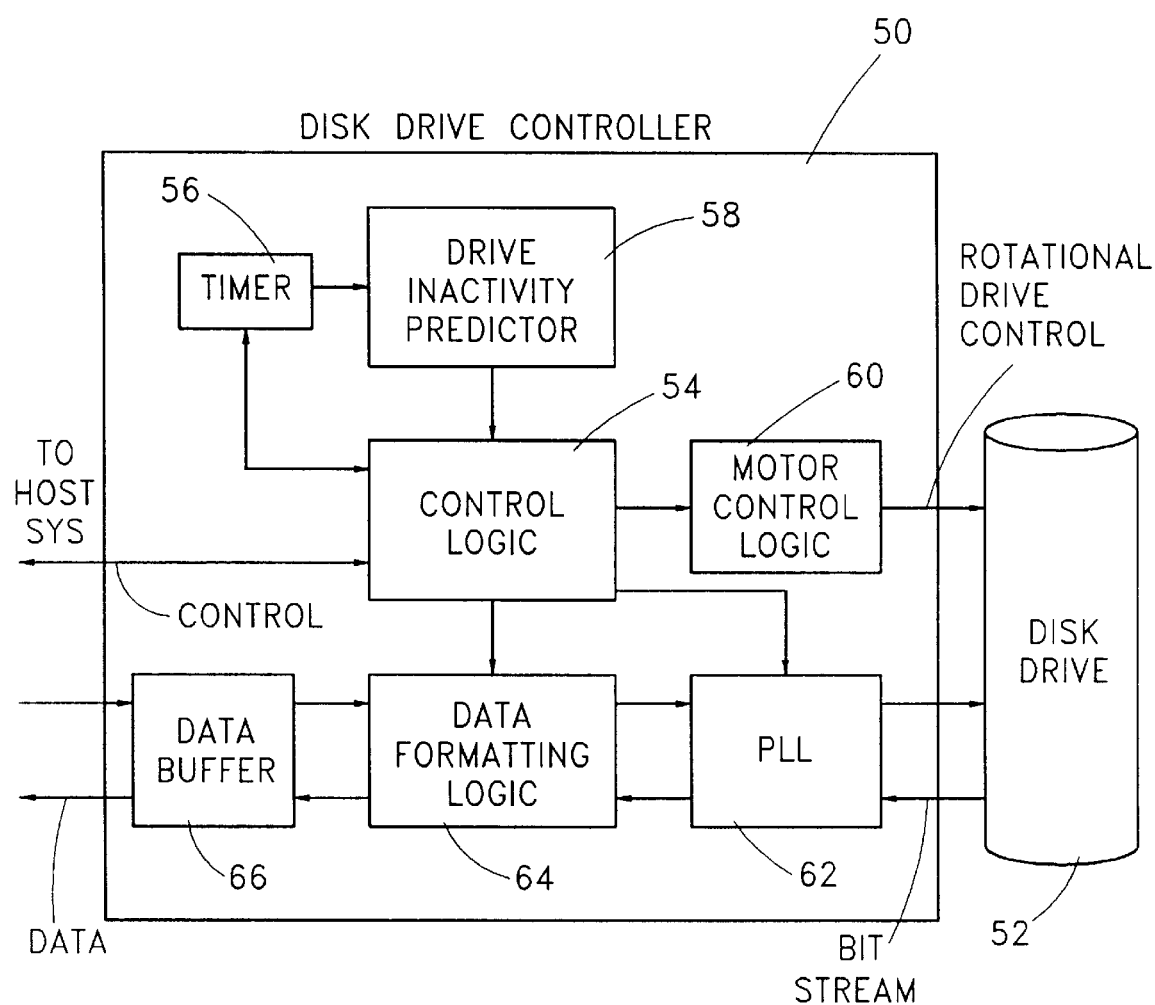
FIG. 1 is a block diagram of a preferred embodiment of a system in accordance with the invention.

FIG. 1 shows a block diagram of a preferred embodiment of the system of the present invention. The system includes a disk drive controller 50 for controlling the state of a disk drive 52. In a preferred embodiment, the disk drive will be equipped with magnetoresistive read/write heads such as are manufactured by IBM. The disk drive will preferably employ an actuator that parks the heads safely prior to the disk stopping to eliminate any concern about failure.

The disk drive controller comprises control logic 54, programmed in a manner to be described below, for controlling the operation of the various other components of the controller 50. A timer 56 provides timing information to the control logic so that the control logic can determine, for instance, the duration of current disk activity or inactivity, or the duration of the disk drivers operation in a particular state (e.g., disk speed). The timer is actuated by signals from the control logic, which indicate starting and stopping of data transfer or disk drive state changes.

A drive inactivity predictor 58 receives timing signals from the timer 56 and monitors the duration of the present disk activity/inactivity and produces continuously updated inactivity prediction signals. The manner in which these predictions are made will be discussed in detail with respect to FIG. 1. The inactivity prediction signals are provided to control logic 54 to be used to govern disk drive state changes in order to optimize power consumption.

Control logic 54 provides state change instructions to motor control logic 60, which converts the state change instructions into output control signals for reducing or increasing the rotational speed of the disk drive 52, as appropriate. A suitable motor control logic circuit will be capable of translating digital control signals received from the control logic 54 into analog disk drive motor control signals.

Control logic 54 also provides bit rate instructions to a programmable phase locked loop (PLL) 62 to allow data to be read from and written to the disk drive at varying rotational speeds. Also coupled to the PLL is data formatting logic (DFL) circuit 64. The DFL formats data read by the PLL 62 from the disk drive in a manner suitable for transfer to the host processor. The DFL also formats data from the processor as necessary for it to be written to the disk drive. Specifically the DFL: partitions blocks of data into records prior to writing to the disk; adds CRC codes to the records for error detection; and encodes the data into a format to be written on the disk. Data buffer 66 buffers data from/to the host processor.

Control logic 54 is also bidirectionally coupled with the host processor (not shown) of the computer system. The host processor will provide the control logic with such information as specific data to be written to disk, addresses in the host's memory for DMA setup, and various control signals for carrying out the data transfer.

In one embodiment of the invention, the algorithm carried out by the control logic 54 can be a simple one, such as using a fixed threshold value of inactivity time to reduce the rotational speed to its next lower state, while continuing the reading/writing of data from/to the disk drive. In a preferred embodiment, however, the algorithm can be made more elaborate so as to take into account the activity history of the drive. For example, the scheme disclosed in U.S. Pat. No. 5,355,366 (incorporated herein by reference) could be used, whereby an inactivity prediction algorithm could be implemented based on an adaptive infinite impulse response filter (IIR). According to this scheme, the predicted length of the next inactivity period is determined from the current inactivity period, as indicated by the disk controller timer 58, and the previous prediction, such that:

$$L_{n+1} = G_n + (L_n - \alpha D_n), \quad (1)$$

where $L_{n+1}$ is the predicted length of the next inactivity period; $G_n$ is the length of current inactivity period; $L_n$ is the length of the previous predicted inactivity period; $\alpha$ is an adaptive aging factor which determines the importance given to the previous prediction and $D_n$ is the length of the current activity period plus the preceding inactivity period. The aging factor $\alpha$ is preloaded with the default aging factor before the inactivity prediction process begins. This default aging factor, $\alpha_0$, is precomputed so that the prediction error is minimized for a variety of disk drive activity patterns. After the aging factor $\alpha$ is loaded, it is dynamically adjusted and can be increased or decreased depending on the sign of the prediction error. If the predicted inactivity period $L_{n+1}$ is larger than the actual one, the value of $\alpha$ is increased. Similarly, if $L_{n+1}$ is smaller than the actual one, the value of $\alpha$ is decreased.

The predicted value of $L_{n+1}$ is used to determine whether to switch the drive to a different state, i.e., adjust the rotational speed. During heavy disk activity, $L_{n+1}$ remains low, and no reduction of the rotational speed will be allowed. A high value of $L_{n+1}$ will indicate that recent activity has been light, and that no activity will be likely to occur in the near future. This high value of $L_{n+1}$ will trigger a reduction in rotational speed of the disk drive. When the value of $L_{n+1}$ is greater than some large predetermined value, the power to the disk motor can be cut to zero, allowing the disk to rotate freely without speed control, saving still more power. When a request to the disk to seek for data occurs while the disk is "spinning down" in this way, the motor will only speed up to one of the slower rotational speeds, and at the same time the predictor algorithm will reset its prediction to a shorter value, since disk accesses typically come in groups. Under control from the software, the disk characteristics can be set to restore speed from spinning down to full speed if that is deemed desirable for maximum disk performance.

If the disk drive is currently operating at less than its maximum speed, and heavy activity is either predicted or encountered, the disk drive speed will be increased. Likewise, if there is an extended inactivity period (i.e., a period greater than a threshold period), the disk drive can be depowered completely.

The disk drive activity monitoring and rotational speed changes will preferably be implemented via microcode in the disk drive controller, as the activity times involved are of the order of seconds. FIG. 1 shows a flow-chart implementation of a preferred prediction algorithm for carrying out the above functions of the present invention. It should be recognized by those skilled in the art that the prediction algorithm can also be implemented in driver software in read-only memory on the controller.

Figure 2:
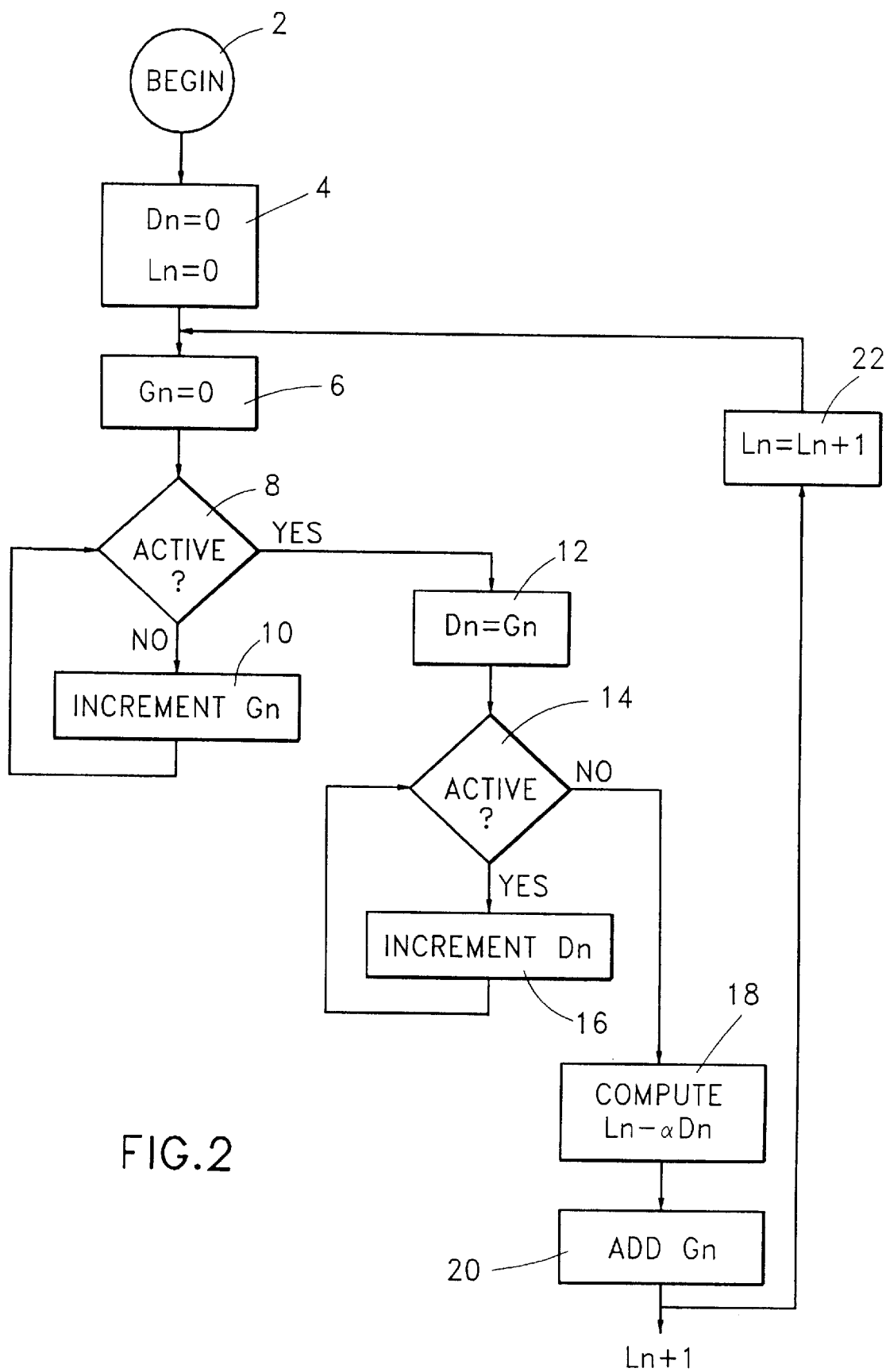
FIG. 2 is a flow diagram describing the method of the invention.

The algorithm of FIG. 2 proceeds as follows. The procedure begins at block 1. At block 4, the values of $D_n$ and $L_n$ are initialized to 0, indicating that no historical ($L_n$) or current ($D_n$) activity information is known. At block 6, $G_n$ (current inactivity) is set to 0 to initialize the current inactivity period in anticipation of tracking this information. Next, at block 8, it is determined whether the disk drive is "active", i.e., whether data is currently being written to or read from the drive. If the drive is not active, $G_n$ is incremented, block 10, to track the inactivity period. The output of block 10 returns to decision block 8, and the value of $G_n$ will continue to be incremented as long as the drive is inactive. Accordingly, the value of $G_n$ will be proportional to the duration of the inactivity period. When the drive becomes active, decision block 8 will direct the process to block 12, where the variable $D_n$ is set to equal $G_n$. As stated previously, $D_n$ represents the length of the current activity period (at this point, 0) plus the preceding inactivity point (at this point, $G_n$). At decision block 14, it is again determined whether the drive is active. If the drive is still active, $D_n$ is incremented, block 16. Because the output of block 16 returns to block 14, the variable $D_n$ will continue to be incremented as long as the disk drive remains active. When disk drive activity ceases, the value ($L_n - \alpha D_n$) is computed, block 18. As discussed previously, $\alpha$ is an adaptive aging factor. In block 20, $G_n$ is added to the value computed in block 18, resulting in the value of $L_{n+1}$ (equation (1)). The value of $L_{n+1}$ is updated after each period of activity by setting the value of $L_{n+1}$ equal to $L_n$ in block 22, and supplying this value of $L_n$ to the input of block 6. Thus, this iterative procedure provides an accurate determination of predicted inactivity duration by using historical disk activity information.

In addition to the above, other techniques can be used to further minimize power consumption. Since the timed interval in which no activity occurs is a period in which power has been wasted, other policies can be employed which reduce this waste by turning off or starting "spin-down" the drive after each data fetch is complete, unless this default (which can be thought of as timeout value=0) is overridden. One means of overriding the zero timeout is by allowing a fetch command to have two flavors: "fetch and continue" and "fetch and finish." After the first type of fetch, the disk remains active. After the second type, the disk motor power is depowered. If the disk slows down gradually, the delay incurred in restoring the motor to a valid active speed is reduced from what it would be if the motor had completely stopped, and the power to restore it to an operational speed is reduced. FIG. 3 shows an example of the savings from this feature as a function of time between seek operations. This type of policy is most effectively implemented in software, e.g., in a disk file cache or in the file system itself.

Finally, the "touch" command used in some high-performance processors to cause a memory cache to look for data in anticipation of its use can be generalized for use with rotating media for power reduction. We propose that the method by which a file cache could obtain the best performance from a disk drive which is being aggressively managed for low power, is to begin each access sequence with an early "seek but don't bother to read" command to wake up the motor, followed by a "fetch and continue" request, and terminating the process with a "fetch and finish" request for the last piece of data. These commands will be issued by the host processor to the controller 50 via the control bus. Thus, if at the conclusion of a read/write that is not part of a continuing group of accesses (as indicated by a code accompanying the read/write), the disk drive can be changed to (and maintained at) a slower rotational state or depowered. It should be noted that in a preferred embodiment of the invention, the programmable PLL will have the capability to operate at one or more incremental speeds between full speed and zero. As the disk drive slows down, and when a read/write request occurs, the speed of the drive will seek the closest allowable intermediate speed to the current speed and the PLL will adjust accordingly.

As the disk slows down, an upper bound to its speed can be estimated from the time elapsed since the spin-down started. This estimate is used to find the closest allowed speed. The strength of the data signal from the read head through the channel is used as a measure of convergence on the desired speed.

In the case when a long time has elapsed since the last request for data, a hard drive which loses its speed gradually, will still incur what may be one or more seconds of speedup time. This may not degrade the perceived performance, since in an interactive system the speedup time (a matter of seconds) will be perceived as part of the time which has passed between requests for interactive service (typically a matter of minutes). Also, by resetting the PLL 62 and active speed to lower values as the disk spins down, it is possible to keep the time and energy required to resume reading to smaller values than the full (from stop to full speed) delay and power required by the disk file. This is a performance tradeoff (data transfer speed vs. energy consumption) which can be made at device setup (depending on whether this is a client or server system or can be managed during use by a power management subsystem, such as is implemented in a dedicated application or in modern operating systems.

In a preferred embodiment, the disk drive can operate with the following policies:

if the predicted interval between accesses ($L_{n+1}$) is greater then the actual time t since the last access, then power-off the disk drive motor and let it spin down to the next lowest allowable rotational speed;

if the elapsed time t is greater than about $2L_{n+1}$, keep spinning the drive down;

if operating in one of the lower speed states and the predicted interval drops below the actual current interval, the drive speed will be increased to the next state;

if the drive is in a free spin down state and a read/write request occurs, the normal policy is to speed up to the next allowable level; if this next level is not the maximum level, than monitor $L_{n+1}$ to determine whether further speed increase is required;

the "hot" policy, i.e., predicted access volume is heavy, requires that the disk speed be increased to full speed.

Referring now to FIG. 3, it can be seen that the disk drive power management technique of the present invention results in significant power savings as compared with prior methods. The dashed lines represent preset "timeout" power-down intervals used in prior art systems. For instance, line 206 represents the average power consumed over time by a system employing a 48 second time period. It can be seen that the average power consumed in a system employing the present invention, as represented by curve 200, is significantly less.

While the invention has been described particularly with respect to preferred embodiments thereof, it will be recognized by those skilled in the art that modifications to the disclosed embodiment can be effected without departing from the spirit and scope of the invention.

We claim:

1. A method for conserving electrical power during inactivity periods between computer disk accesses, comprising the steps of:

a) monitoring each occurrence of a disk access, said disk access comprising at least one of a read operation and a write operation;

b) measuring the time duration of inactivity periods between each disk access;

c) predicting the time duration of a next inactivity period following the measured inactivity periods based on the measured time duration of the inactivity periods;

d) following a period of disk activity, reducing the rotational speed of the disk if the predicted time duration is greater than a predetermined value;

e) upon a subsequent disk access, reading/writing from/to the disk while the disk is rotating at the reduced rotational speed.

2. The method of claim 1, further comprising:

increasing the rotational speed of the disk when disk accessing activity exceeds a threshold value.

3. The method of claim 2, comprising increasing the rotational speed of the disk to a maximum speed when the disk activity exceeds the threshold value.

4. The method of claim 1, further comprising:

depowering the disk when a measured inactivity period exceeds a predetermined threshold.

5. The method of claim 1, further comprising depowering the disk at the conclusion of any read or write operation that is not part of a continuing group of accesses.

6. A data storage system, comprising;

a disk drive including at least one rotating data storage disk;

means for accessing the disk to read data from and write data to the disk;

means for measuring a time duration of an inactivity period between disk accesses;

means for predicting a time duration of a next inactivity period following one or more measured inactivity periods;

means for reducing the rotational speed of the disk when the predicted time duration of the next inactivity period is larger than a predetermined value;

means for reading data from and writing data to the disk when it is rotating at the reduced rotational speed.

7. The system of claim 6, further comprising:

means for increasing the rotational speed of the disk to a maximum speed when disk accessing activity exceeds a threshold.

8. The system of claim 6, further comprising increasing the rotational speed of the disk to an intermediate speed when disk accessing activity exceeds a threshold.

9. The system of claim 6, further comprising means for depowering the disk when the measured inactivity period exceeds a predetermined threshold.

10. The system of claim 6, further comprising means for depowering the disk at the conclusion of any read or write operation that is not part of a continuing group of accesses.

11. The system of claim 6, wherein the means for reading data comprises:

a read-write head;

control means for controlling the read-write operation of the read-write head;

a motor controller for controlling the rotation of the storage medium.

12. The system of claim 11, further comprising means for parking the read/write head prior to stopping the rotation of the disk.

13. The system of claim 6, wherein the means for reading data from and writing data to the disk when it is rotating at the reduced speed comprises a phase-locked-loop coupled to the read-write head.

14. The system of claim 6, wherein the means for predicting comprises means for computing $$L_{n+1}=G_n+(L_n-\alpha D_n),$$

where $L_{n+1}$ is the predicted length of the next inactivity period; $G_n$ is the length of a current measured inactivity period; $L_n$ is the length of a previous inactivity period; and $\alpha$ is an adaptive aging factor for the disk drive.

15. The method of claim 14 further comprising a timer coupled to the control circuit, the timer comprising means for measuring the activity and inactivity periods of the disk.

16. A method for controlling a disk comprising:

rotating the disk at a first rotational speed greater than zero when disk activity is above a predetermined level;

rotating the disk at a second rotational speed greater than zero but different than the first rotational speed, when the disk activity is at or below the predetermined level; and reading data from and writing data to the disk when it is operating at the second rotational speed.

17. The method of claim 12, further comprising predicting when the disk activity will be at or below the predetermined level and causing the disk to operate at an intermediate rotational speed prior to the disk activity falling to the predetermined level.

* * * * *